(12) United States Patent
    Nakada et al.

(10) Patent No.: US 11,180,027 B2
(45) Date of Patent: Nov. 23, 2021

(54) HEAD-UP DISPLAY DEVICE FOR VEHICLE

(71) Applicant: KOITO MANUFACTURING CO., LTD., Tokyo (JP)

(72) Inventors: Yusuke Nakada, Shizuoka (JP); Michihiko Hayakawa, Shizuoka (JP); Kouhei Murata, Shizuoka (JP); Shunsuke Okamura, Shizuoka (JP); Jun Iwasaki, Shizuoka (JP); Satoshi Yamamura, Shizuoka (JP); Takanobu Toyoshima, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 16/767,499

(22) PCT Filed: Nov. 20, 2018

(86) PCT No.: PCT/JP2018/042901
    § 371 (c)(1),
    (2) Date: May 27, 2020

(87) PCT Pub. No.: WO2019/103014
    PCT Pub. Date: May 31, 2019

(65) Prior Publication Data
    US 2020/0353817 A1    Nov. 12, 2020

(30) Foreign Application Priority Data

Nov. 27, 2017  (JP) .............................. JP2017-227039
Nov. 27, 2017  (JP) .............................. JP2017-227045

(51) Int. Cl.
    *H04N 9/31*     (2006.01)
    *B60K 35/00*    (2006.01)
    (Continued)

(52) U.S. Cl.
    CPC ................ *B60K 35/00* (2013.01); *B60Q 1/02* (2013.01); *G02B 27/0101* (2013.01);
    (Continued)

(58) Field of Classification Search
    CPC ............ B60K 35/00; B60K 2370/1529; B60K 2370/349; B60K 2370/23; G02B 27/0149;
    (Continued)

(56) References Cited

U.S. PATENT DOCUMENTS 5,510,983 A * 4/1996 Iino ........................ B60K 35/00
                                                                    340/441
2005/0154505 A1    7/2005  Nakamura et al.
(Continued)

FOREIGN PATENT DOCUMENTS

JP    2004-136838 A     5/2004
JP    2004-271830 A     9/2004
(Continued)

OTHER PUBLICATIONS

International Search Report issued in International Application No. PCT/JP2018/042901, dated Feb. 5, 2019 (5 pages).
(Continued)

*Primary Examiner* — Michael Lee
(74) *Attorney, Agent, or Firm* — Osha Bergman Watanabe & Burton LLP

(57) ABSTRACT

A projection unit is configured to provide at least one of a first image adapted to be presented to the inside of a vehicle and a second image adapted to be presented to the outside of the vehicle. A dimming film is configured to be placed in at least one of a first state in which first light corresponding to the first image is directed to the inside of the vehicle and a second state in which second light corresponding to the second image is directed to the outside of the vehicle. A control unit is configured to place the dimming film in the
(Continued)

first state when the first image is provided, and to place the dimming film in the second state when the second image is provided.

5 Claims, 8 Drawing Sheets

(51) Int. Cl.
*B60Q 1/02* (2006.01)
*G02B 27/01* (2006.01)

(52) U.S. Cl.
CPC ....... *G02B 27/0149* (2013.01); *H04N 9/3141* (2013.01); *H04N 9/3182* (2013.01); *B60K 2370/1529* (2019.05); *B60K 2370/23* (2019.05); *B60K 2370/349* (2019.05); *G02B 2027/0118* (2013.01); *G02B 2027/0154* (2013.01)

(58) Field of Classification Search
CPC ........ G02B 27/0101; G02B 2027/0118; G02B 2027/0154; H04N 9/3182; H04N 9/3141; B60Q 1/02
USPC ......................................................... 348/148

See application file for complete search history.

(56) References Cited

U.S. PATENT DOCUMENTS

| | | | |
|---|---|---|---|
| 2014/0218702 A1* | 8/2014 | Yasui | G02B 26/0816 353/99 |
| 2016/0004076 A1 | 1/2016 | Matsubara et al. | |
| 2016/0311323 A1* | 10/2016 | Lee | B60K 35/00 |
| 2017/0192234 A1 | 7/2017 | Lai | |
| 2017/0357088 A1* | 12/2017 | Matsuzaki | B60K 35/00 |
| 2018/0373033 A1* | 12/2018 | Oshima | G02B 27/0101 |
| 2019/0012983 A1* | 1/2019 | Oshima | G02B 27/01 |
| 2019/0018238 A1* | 1/2019 | Jenson | G02B 5/20 |
| 2019/0373230 A1* | 12/2019 | Mino | G02B 27/01 |
| 2020/0012103 A1* | 1/2020 | Kasazumi | H04N 5/74 |
| 2020/0073121 A1* | 3/2020 | Banyay | G02B 27/0101 |
| 2020/0124849 A1* | 4/2020 | Tsuji | G06F 3/147 |

FOREIGN PATENT DOCUMENTS

| | | |
|---|---|---|
| JP | 2005-189725 A | 7/2005 |
| JP | 2008-174034 A | 7/2008 |
| JP | 2010-032906 A | 2/2010 |
| JP | 2013-067209 A | 4/2013 |
| JP | 2013-257584 A | 12/2013 |
| JP | 2016-136199 A | 7/2016 |
| JP | 6097382 B2 | 3/2017 |

OTHER PUBLICATIONS

Written Opinion issued in International Application No. PCT/JP2018/042901, dated Feb. 5, 2019 (13 pages).

* cited by examiner

☐ FIRST COLOR
▦ SECOND COLOR
▨ THIRD COLOR

HEAD-UP DISPLAY DEVICE FOR VEHICLE

FIELD

The presently disclosed subject matter relates to a head-up display device adapted to be installed in a vehicle.

BACKGROUND

Japanese Patent Publication No. 2013-257584A and Japanese Patent No. 6097382B disclose a head-up display device (hereinafter, referred to as an HUD device) capable of presenting information to an occupant in a vehicle.

The HUD device tends to be inconspicuously placed in the dashboard. However, since a large number of devices are going to be located in the dashboard, it is difficult to secure installation space in the dashboard for the HUD device consisting of a large number of components, such as a light source, a reflector, a projection device, or the like.

SUMMARY

Technical Problem

A first goal to be achieved by the presently disclosed subject matter is to provide a HUD device capable of presenting information not only to an occupant in a vehicle but also to the outside of the vehicle.

A second goal to be achieved by the presently disclosed subject matter is to provide a HUD device capable of reducing the installation space and the number of components.

Solution to Problem

In order to achieve the first goal described above, a first illustrative aspect of the presently disclosed subject matter provides a head-up display device adapted to be installed in a vehicle, comprising:

an image providing device configured to provide at least one of a first image adapted to be presented to the inside of the vehicle and a second image adapted to be presented to the outside of the vehicle;

an optical member configured to be placed in at least one of a first state in which first light corresponding to the first image is directed to the inside of the vehicle and a second state in which second light corresponding to the second image is directed to the outside of the vehicle; and a control device configured to place the optical member in the first state when the first image is provided, and to place the optical member in the second state when the second image is provided.

The head-up display device according to the first illustrative aspect may be configured such that the control device is configured to control the image providing device such that luminous intensity of the second light is made higher than luminous intensity of the first light.

The head-up display device according to the first illustrative aspect may be configured such that the first image and the second image are displayed in different positions in the vehicle.

The head-up display device according to the first illustrative aspect may be configured to be disposed in a lamp chamber that accommodates a lighting device configured to emit illumination light to the outside of the vehicle.

The head-up display device according to the first illustrative aspect may be configured such that the second light travels to the outside of the vehicle through a window of the vehicle.

In order to achieve the second goal described above, a second illustrative aspect of the presently disclosed subject matter provides a head-up display device adapted to be installed in a vehicle, comprising:

a light source;

a first optical member configured to guide light emitted from the light source to a display area provided in the vehicle; and a second optical member configured to guide light emitted from the light source to the outside of the vehicle.

The head-up display device according to the second illustrative aspect may be configured so as to further comprise a movable reflector configured to guide light emitted from the light source to either the first optical member or the second optical member.

The head-up display device according to the second illustrative aspect may be configured so as to further comprise a common housing defining a space for accommodating the light source, the first optical member, and the second optical member.

The head-up display device according to the second illustrative aspect may be configured such that:

the display area is a portion of a window of the vehicle; and light having passed through the second optical member is guided to the outside of the vehicle through the window.

The head-up display device according to the second illustrative aspect may be configured so as to further comprise a drawing device configured to draw a pattern in an area outside the vehicle with the second optical member.

The head-up display device according to the second illustrative aspect may be configured so as to further comprise a colorizing optical member configured to colorize the light to be guided to the display area.

DESCRIPTION OF EMBODIMENTS

Figure 1:
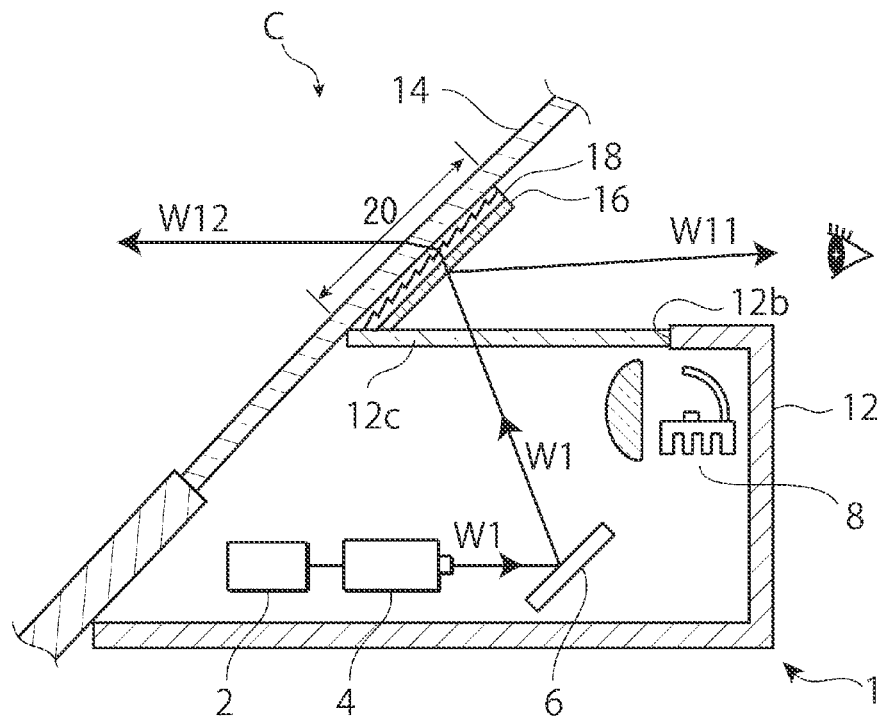
FIG. 1 is a vertical section view illustrating a configuration of an HUD device according to the first embodiment.

Exemplary embodiments will be described below in detail with reference to the accompanying drawings. The same or equivalent components, members, and processes illustrated in the respective drawings are denoted by the same reference numerals, and duplicate descriptions will be omitted as appropriate.

FIG. 1 is a vertical sectional view schematically illustrating a structure of a HUD device 1 according to the first embodiment. The HUD device 1 is a device for displaying an image on a predetermined display area 20 (a predetermined area of a windshield 14) provided in front of an occupant of a vehicle. The image includes information that may assist driving operations. The HUD device 1 includes a dimming film 16, a prism sheet 18, and a housing 12.

The housing 12 is disposed below the windshield 14 of a vehicle C to form a lamp chamber with a portion of the windshield 14 and a portion of a frame of the vehicle C. A head lamp unit 8, a control unit 2, a projection unit 4, and a reflecting mirror 6 are housed in the lamp chamber. Each component is attached to the housing 12 by a support mechanism (not illustrated). The control unit 2, the projection unit 4 and the reflecting mirror 6 are components of the HUD device 1.

The projection unit 4 emits light for projecting an image. Since the projection unit 4 uses a so-called known projector device, a detailed description thereof will be omitted. The projection unit 4 is an example of an image providing device.

The control unit 2 includes a processor and a memory. The processor may be a CPU or an MPU capable of executing computer programs. The memory can be a semiconductor memory such as a RAM, a ROM, a flash memory, or the like. The processor and the memory may be provided as a general-purpose microprocessor and a general-purpose memory, or may be provided as a dedicated integrated circuit device such as a microcontroller, an ASIC, an FPGA, or the like. Information corresponding to a projectable image is stored in advance in the memory. The image includes an image presented to the inside of the vehicle (first image) and an image presented to the outside of the vehicle (second image). The projection unit 4 projects an image based on a command from the control unit 2. The control unit 2 is an example of a control device.

The reflecting mirror 6 is arranged so as to face both the projection unit 4 and the display area 20. The reflecting mirror 6 reflects light W1 emitted from the projection unit 4 so that the reflected light W1 is incident on the display area 20.

As the head lamp unit 8, for example, a reflective or projection type lamp unit may be used. The configuration of the head lamp unit 8 illustrated in FIG. 1 is an example of the projection type. The head lamp unit 8 collects and reflects light from the light source by a reflector, and irradiates the light toward an area ahead of the vehicle C through the windshield 14. Thus, a predetermined light distribution pattern is formed in the area ahead of the vehicle C.

The display area 20 of the windshield 14 has a three-layer structure. Specifically, an interior surface of the windshield 14 is covered with a prism sheet 18. The prism sheet 18 is further covered with the dimming film 16.

The dimming film 16 has a configuration in which optical diffusion property and transmittance are varied when voltage is applied. By adjusting the applied voltage, the transmittance of the dimming film 16 can be continuously varied. The transmittance of the dimming film 16 is increased when the voltage is applied to exhibit a translucent property to allow the incident light to pass through. The transmittance of the dimming film 16 is decreased when the voltage is not applied to serve as a reflective screen that reflects the incident light. The voltage applied to the dimming film 16 is controlled by the control unit 2. In other words, the transmittance of the dimming film 16 is controlled by control unit 2.

The prism sheet 18 has a function of changing the traveling direction of the incident light. The prism sheet 18 is so configured as to refract the light incident from the reflecting mirror 6 toward the area ahead of the vehicle C.

An opening 12b is formed in a top wall of the housing 12 at a position facing the display area 20. A translucent cover 12c allowing light to pass through is provided in the opening 12b. In the HUD device 1, the light W1 emitted from the projection unit 4 is reflected by the reflecting mirror 6, and passes through the translucent cover 12c. Thus, an image corresponding to the light W1 is projected on the display area 20. If the transmittance of dimming film 16 is low, light W1 is reflected by dimming film 16 and is visually recognized by an occupant in the vehicle as reflected light W11. The reflected light W11 is an example of the first light. When the transmittance of the dimming film 16 is increased by the voltage application, the light W1 is transmitted through the dimming film 16, is then refracted by the prism sheet 18, and is finally emitted toward the area ahead of the vehicle C as transmitted light W12. Accordingly, an image is displayed in the display area 20 to the outside of the vehicle so that the image is visually recognized by a pedestrian, for example. The light W12 is an example of the second light.

According to the configuration as described above, the occupant in the vehicle can obtain driving support information or the like through the image presented to the inside of the vehicle. On the other hand, an image including a vehicle state and operation information or the like can be presented to pedestrians or other vehicles. For example, information can be provided to pedestrians outside the vehicle or communication with occupants of other vehicles can be performed by displaying an image representing a message "After you", a preliminary announcement of the vehicle operation (stop, start, left turn, etc.), a level of self-driving, or the like. Since such images can be presented to the inside and the outside of the vehicle only with the HUD device 1, the installation space and the number of components can be reduced in comparison with a case where the device for presenting an image to the inside of the vehicle and the device for presenting an image to the outside of the vehicle are individually installed.

The luminous intensity of the light source of the projection unit 4 can be adjusted by the control unit 2. Specifically, the control unit 2 controls the luminous intensity of the light source of the projection unit 4 so that the luminous intensity of the light W12 corresponding to the image presented to the outside of the vehicle is higher than the light W11 corresponding to the image presented to the inside of the vehicle. Thus, while the attention of the pedestrian outside the vehicle can be drawn by displaying an image brightly, the brightness of the image can be decreased for the occupants in the vehicle to prevent the glare.

The display area 20 for displaying an image is a portion of the windshield 14 provided in the vehicle C. The head lamp unit 8 is also housed in the housing 12 to emit light to the outside of the vehicle through the windshield 14. The installation space and the number of components can be reduced in comparison with a case where a housing for the HUD device 1 and a housing for the head lamp unit 8 are provided individually. In addition, the placement of the head lamp unit 8 in the vehicle allows the windshield 14 to be positioned so as to cover a front face of the vehicle C more widely to accommodate a futuristic design. In addition, since the windshield 14 is visible through the translucent cover 12c, the field of view of the occupant is also widened. The head lamp unit 8 is positioned behind the control unit 2, the projection unit 4, and the reflecting mirror 6 to prevent the occupant from sensing the glare of the illumination light of the head lamp unit 8. With such a configuration, the HUD device 1 and the head lamp unit 8 can be disposed in the vehicle C with higher optical and structural efficiency.

Figure 2:
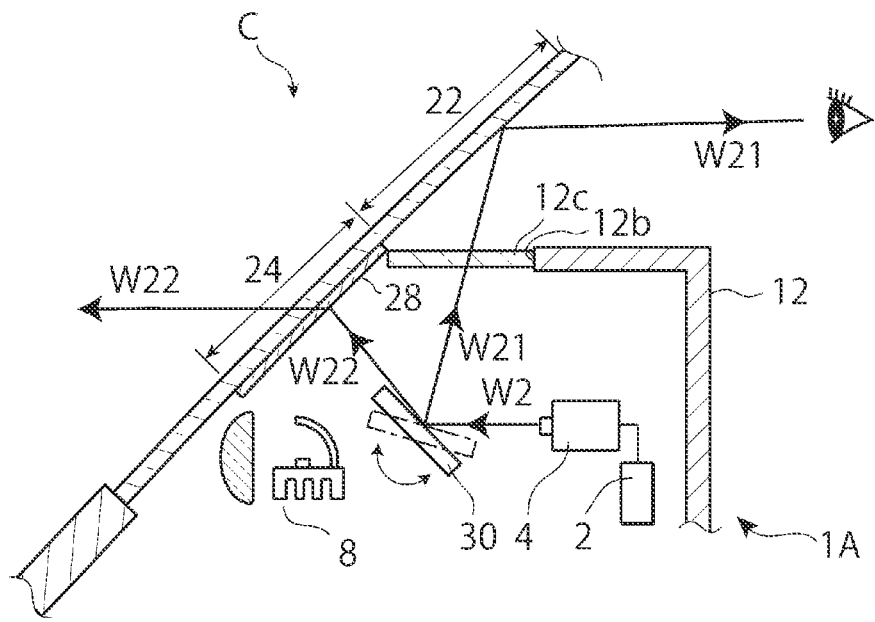
FIG. 2 is a vertical section view illustrating a configuration of an HUD device according to the second embodiment.

FIG. 2 is a vertical sectional view schematically illustrating a configuration of a HUD device 1A according to the second embodiment. Components similar to or corresponding to those in FIG. 1 are denoted by the same reference numerals, and duplicate descriptions will be omitted as appropriate. In the present embodiment, an area where an image is displayed by the HUD device 1A is divided into an interior display area 22 for displaying an image presented to the inside of the vehicle, and an exterior display area 24 for displaying an image presented to the outside of the vehicle. Both the interior display area 22 and the exterior display area 24 are portions of the windshield 14 of the vehicle C. The HUD device 1A includes a movable mirror 30. The movable mirror 30 reflects light W2 corresponding to an image projected from the projection unit 4 toward either the interior display area 22 or the exterior display area 24. The movable mirror 30 is an example of the optical member. The head lamp unit 8 is positioned such that the emitted light is incident on the exterior display area 24.

The movable mirror 30 is pivotable by an actuator. By controlling a facing angle with respect to the projection unit 4, it is possible to control a direction that the incident light is reflected. The reflecting direction of the light by the movable mirror 30 is controlled by the control unit 2.

The exterior display area 24 includes a transparent screen 28 on the interior of the windshield 14. The transparent screen 28 is a transmission type wherein the incident light W22 corresponding to an image to be projected travels to an area ahead of the vehicle C while being refracted. Accordingly, pedestrians outside the vehicle or the like can visually recognize the image corresponding to the light W22. The light W22 is an example of the second light.

Incident light W21 corresponding to an image projected on the interior display area 22 is visually recognized to the occupant as a virtual image formed in an area ahead of the vehicle C. Since the virtual image is visible overlapping the scene over the windshield 14, the occupant can visually recognize the projected image without moving the line of sight from the gaze present on the traveling path of the vehicle C.

In the HUD device 1A, the light W2 corresponding to an image projected by the projection unit 4 is incident on the movable mirror 30. The movable mirror 30 reflects the incident light W2 toward the interior display area 22 or the exterior display area 24.

In a case where an image projected by the projection unit 4 is intended to be presented to the inside of the vehicle, the control unit 2 controls the attitude of the movable mirror 30 so as to reflect the light W2 toward the interior display area 22. The image corresponding to the light W21 reflected by the movable mirror 30 is projected on the interior display area 22, so that the projected image is visually recognized by the occupant in the vehicle as a virtual image. In a case where an image projected by the projection unit 4 is intended to be presented to the outside of the vehicle, the control unit 2 controls the attitude of the movable mirror 30 so as to reflect the light W2 toward the exterior display area 24. Accordingly, the image corresponding to the light W22 reflected by the movable mirror 30 is projected on the transparent screen 28 of the exterior display area 24. The light W22 is refracted and emitted to the outside of the vehicle. Accordingly, the image corresponding to the light W22 is visually recognized by a pedestrian or the like outside the vehicle.

Optical characteristics necessary for displaying the image to be presented to the inside of the vehicle is different from optical characteristics necessary for displaying the image to be presented to the outside of the vehicle. According to the configuration of the present embodiment, it is possible to determine the optical characteristics of the interior display area 22 and the optical characteristics of the exterior display area 24 individually in accordance with the optical characteristics of the image to be displayed. On the other hand, by sharing the optically common portion, it is possible to suppress increases in the installation space and the number of components.

Figure 3:
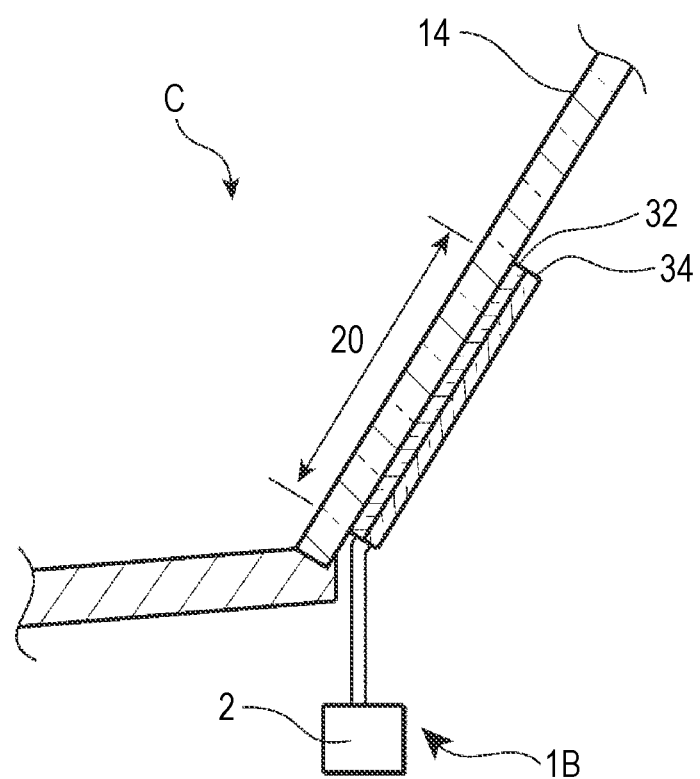
FIG. 3 is a vertical section view illustrating a configuration of an HUD device according to the third embodiment.

FIG. 3 is a vertical sectional view schematically illustrating a structure of a HUD device 1B according to the third embodiment. In the present embodiment, the area 20 in which images are displayed by the HUD device 1B has a three-layer configuration. Specifically, a transparent display 32 is provided so as to be in close contact with the interior of the windshield 14 of the vehicle C. In addition, the interior surface of the transparent display 32 is covered with a dimming film 34.

Figure 4A:
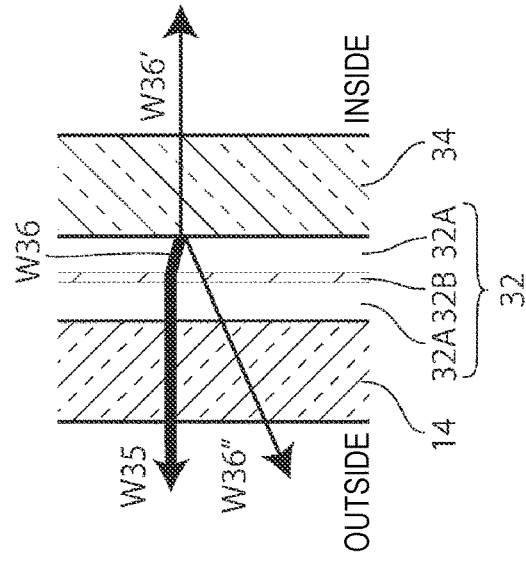
FIGS. 4A to 4C illustrate paths of light emitted from a light emitting layer when an image display is performed with the HUD device of FIG. 3.

The transparent display 32 is an ultrathin and transparent display such as organic light emitting diodes (OLED) that is well-known. As illustrated in FIG. 4A, the transparent display 32 has a structure in which a light emitting layer 32B is sandwiched between two glass plates 32A. The light emitting layer 32B emits light toward both the front face and the back face of the transparent display 32. Accordingly, an image displayed on the transparent display 32 is not only visually recognized from the front side but also visually recognized as a left-right-reversed image from the back side. The light emitting layer 32B has a property of emitting light when a current flows therethrough. By adjusting the amount of current, the brightness of the image displayed on the transparent display 32 (luminance of the light emitting layer 32B) is adjusted. The adjustment of the amount of current is performed by the control unit 2.

The transmittance of the dimming film 34 is adjustable in accordance with the voltage to be applied as in the dimming film 16 of the first embodiment, so that the dimming film 34 exhibits a transparent property, a reflective property, or a translucent property. The control unit 2 also controls voltage to be applied to the dimming film 34.

Figure 4B:
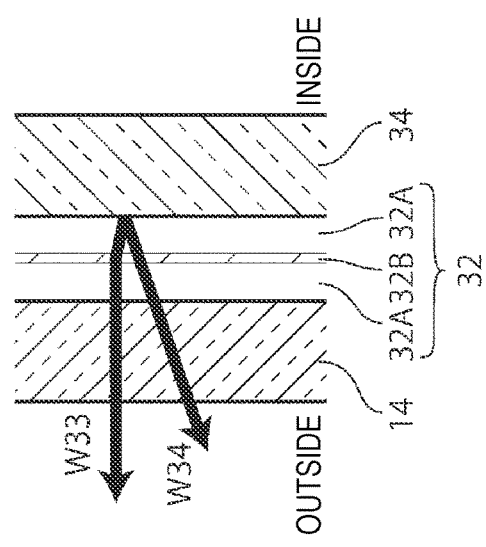
Figure 4C:
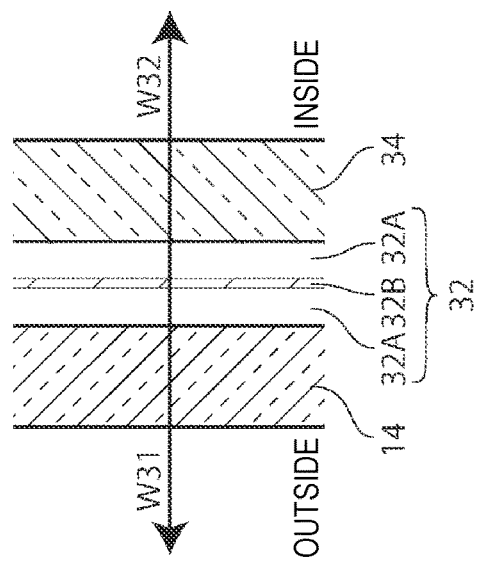

FIG. 4A illustrates paths of light emitted from the light emitting layer 32B when an image displayed by the HUD device 1B is presented into the vehicle. FIG. 4B illustrates paths of light emitted from the light emitting layer 32B when an image displayed by the HUD device 1B is presented to the outside of the vehicle. FIG. 4C illustrates the path of light emitted from the light emitting layer 32B when an image displayed by the HUD device 1B is presented to both the inside and outside of the vehicle. The thickness of the arrow corresponds to the luminous intensity. The thicker the arrow, the higher the luminous intensity. In the HUD device 1B, where an image is presented is determined by adjusting the brightness of the light emitting layer 32B and the transmittance of the dimming film 34.

That is, as illustrated in FIG. 4A, when an image displayed on the transparent display 32 is presented to the inside of the vehicle, the brightness of the light emitting layer 32B is so adjusted as to be relatively low, and the dimming film 34 is so controlled as to exhibit the transparent property. Light W32, that is a portion of the light emitted from the light emitting layer 32B and directed to the inside of the vehicle, passes through the dimming film 34 to be visually recognized by the occupant in the vehicle. In other words, the luminance of the light emitting layer 32B is adjusted to such an extent that the displayed image can be visually recognized by the occupant without difficulty. The light W32 is an example of the first light. Light W31 directed to the outside of the vehicle is also emitted from the light emitting layer 32B. However, since the brightness is kept low on the basis of the occupant in the vehicle, it is possible to reduce the visibility of the displayed image for the pedestrian or the like outside the vehicle.

As illustrated in FIG. 4B, when an image displayed on the transparent display 32 is presented to the outside of the vehicle, the brightness of the light emitting layer 32B is so adjusted as to be relatively high, and the dimming film 34 is so controlled as to exhibit the reflective property. Light W33, that is a portion of the light emitted from the light emitting layer 32B and directed to the outside of the vehicle, travels as it is. Light W34 directed to the inside of the vehicle is reflected by the dimming film 34 and travels to the outside of the vehicle as well. The light W33 and the light W34 are examples of the second light. The light W33 and the light W34 are visually recognized by the pedestrian or the like outside the vehicle. Since the brightness of the light W33 and the light W34 is set to be relatively high, it is possible to enhance the visibility of the displayed image from the outside of the vehicle.

As illustrated in FIG. 4C, when an image displayed on the transparent display 32 is presented to the inside and the outside of the vehicle (when an arrow or the like is displayed), the brightness of the light emitting layer 32B is so adjusted as to be relatively high, and the dimming film 34 is so controlled as to exhibit the translucent property. The "translucent property" corresponds to a state in which the transmittance of the dimming film 34 has a value between a value corresponding to the transparent property and a value corresponding to the reflective property. A portion of light W36 that is emitted from the light emitting layers 32B and directed to the inside of the vehicle passes through the dimming films 34 as light W36' and travels to the inside of the vehicle as it is. Another portion of the light W36 is reflected by the dimming film 34, and travels to the outside of the vehicle as light W36" together with light W35 traveling from the light emitting layer 32B to the outside of the vehicle. Accordingly, the image presented to the outside of the vehicle is brighter than the image presented to the inside of the vehicle.

According to the above configuration, the HUD device 1B can present images with enough visibility to both the occupant in the vehicle and the pedestrian outside the vehicle.

Figure 5:
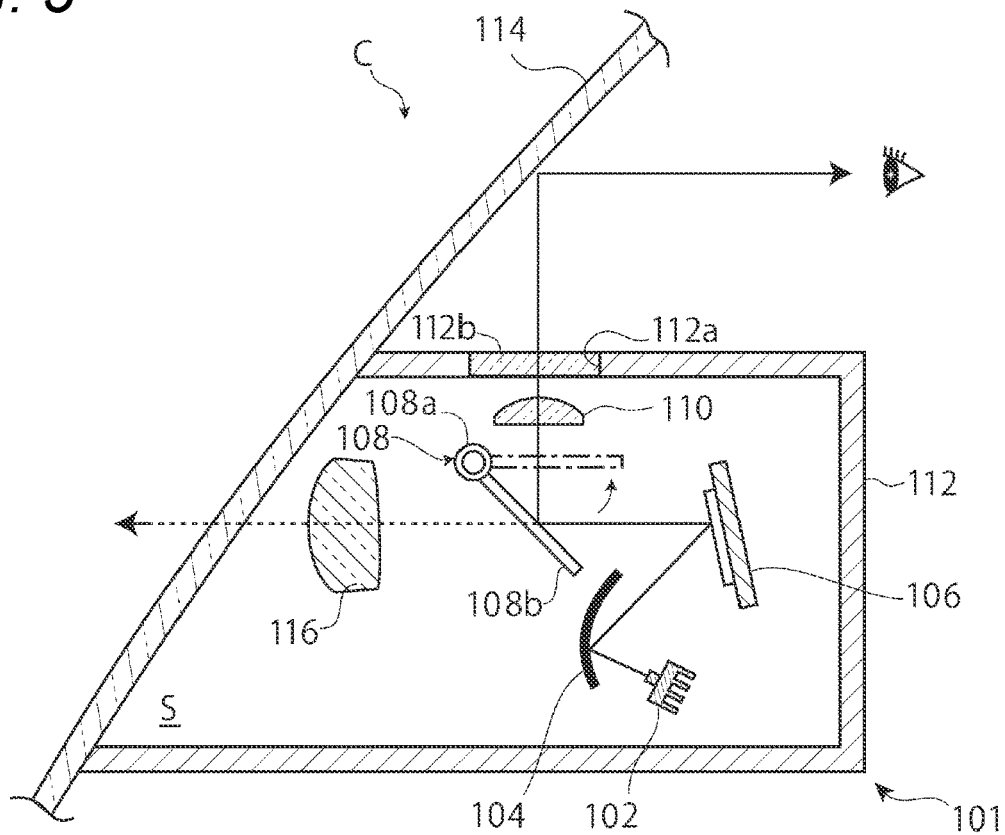
FIG. 5 is a vertical section view illustrating a configuration of an HUD device according to the fourth embodiment.
Figure 16:
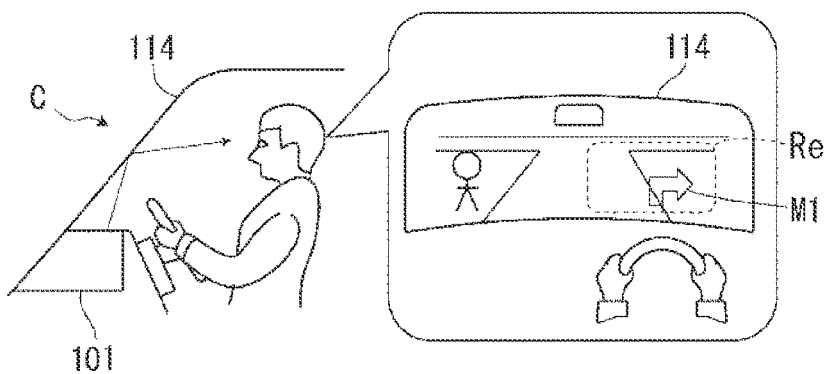
FIG. 16 illustrates outlines of the HUD device.

FIG. 5 is a vertical sectional view schematically illustrating a structure of a HUD device 101 according to the fourth embodiment. As illustrated in FIG. 16, the HUD device 101 is configured to project various images (e.g., an arrow image M1) on a predetermined display area (an HUD display area Re) in a windshield 114 of the vehicle C, so that the images are caused to overlap a scene that is visible through the windshield 114 from a driver's seat or the like.

As illustrated in FIG. 5, a HUD device 101 includes a housing 112 having an opening at a front portion thereof. The housing 112 is disposed so that the opening is closed by a lower portion of a windshield 114 to define a lamp chamber S together with a portion of the windshield 114.

The lamp chamber S accommodates a DMD (Digital Mirror Device) 106, a light source 102, a reflector 104, a movable mirror 108 configured to be pivotable, a first projection lens 110 for projecting light from the DMD 106 on the windshield 114 located above, and a second projection lens 116 for projecting light from the DMD 106 to an area ahead of the vehicle. These components are attached to the housing 112 by a support mechanism (not illustrated).

The light source 102 is an LED (light emitting diode) mounted on a board to emit diffused light by supplying current. The light emitted form the light source is directed to the reflector 104.

The reflector 104 is provided with a reflective surface that reflects light and is arranged to reflect the light emitted from light source 102 toward the DMD 106.

Figure 8:
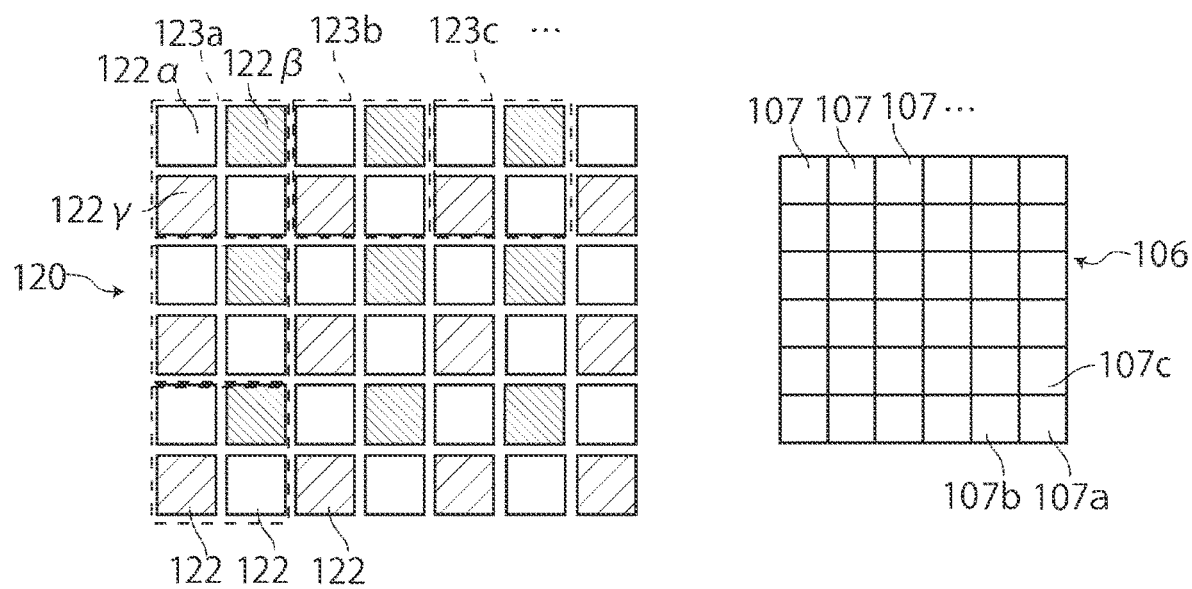
FIG. 8 illustrates respective elements of the DMD and the color filter in the HUD device of FIG. 6 in an enlarged manner.

As illustrated in FIG. 8, the DMD 106 is a two-dimensional imaging device in which a plurality of micro mirrors 107 are arranged in a matrix on a single substrate. The DMD 106 reflects light traveled from the reflector 104 by selectively driving and controlling each micro mirror 107 to form a desired image (imaging light).

As illustrated in FIG. 5, the movable mirror 108 includes a pivot shaft 108a and a mirror 108b. The mirror 108b is pivotable about the pivot shaft 108a. The position of the mirror 108b determines where the imaging light formed by the DMD 106 is projected. When the mirror 108b is placed in a working position indicated by solid lines, the imaging light is reflected by the mirror 108b is incident on the first projection lens 110. If the mirror 108b is placed in a non-working position indicated by dashed lines, the mirror 108b is retracted from the path of the imaging light. Accordingly, the imaging light is directly incident on the second projection lens 116. The movable mirror 108 is an example of the movable reflector.

The first projection lens 110 is disposed so as to project the imaging light to the HUD display area Re on the windshield 114 at a specific size. The first projection lens 110 is an example of the first optical member. An image corresponding to the reflected light from the movable mirror 108 is increased or decreased in size by the first projection lens 110. An opening 112a is formed in a top wall of the housing 112 to allow light from a first projection lens 110 to pass through. A translucent cover 112b that allows the passage of light may be provided so as to close the opening 112a.

The image projected onto the HUD display area Re is visually recognized by the occupant as a virtual image formed in front of the vehicle C. Since the virtual image is visible overlapping the scene over the windshield 114, the occupant can visually recognize the projected image without moving the line of sight from the gaze present on the traveling path of the vehicle C.

The second projection lens 116 is disposed at a position facing the DMD 106. The imaging light is irradiated to an area ahead of the vehicle C through the second projection lens 116 and the windshield 114. Imaging light corresponding to a desired light distribution pattern is formed by the DMD 106 and irradiated through the second projection lens 116 to form the light distribution pattern in the area ahead of the vehicle C. The second projection lens 116 is an example of the second optical member.

In the present embodiment, the emission intensity adjustment of the light source 102, the drive control of the micro mirrors in the DMD 106, the pivot angle of the mirror 108b of the movable mirror 108, properties of the images to be displayed are controlled a control unit 134 (not illustrated in FIG. 5). The control unit 134 includes a processor and a memory. The processor may be a CPU or an MPU capable of executing computer programs. The memory can be a RAM, a ROM, a flash memory, or the like. The processor and the memory may be provided as a general-purpose microprocessor and a general-purpose memory, or may be provided as a dedicated integrated circuit device such as a microcontroller, an ASIC, an FPGA, or the like. The control unit 134 receives a signal from a switch (not illustrated) or the like. The control unit 134 transmits, in response to the received signal, various control signals to the light source 102, the DMD 106, and the movable mirror 108.

According to the above configuration, the HUD device 101 can serve as not only an HUD device to cause the occupant to visually recognize images but also as a lighting device to form a light distribution pattern in an area ahead of the vehicle C. The light emitted from the light source 102 is reflected by the reflector 104 is guided to the DMD 106. The light reflected by the DMD 106 is selectively directed, using the movable mirror 108, to either the first projection lens 110 for providing the image presented to the inside of the vehicle or the second projection lens 116 for directing the light to the outside of the vehicle. This allows the light source 102, the reflector 104, and the DMD 106 to be shared for two functions. Accordingly, the installation space and the number of components can be reduced in comparison with a case where the HUD device and the lighting device are individually provided. In addition, the space utilization efficiency is increased by arranging the light source 102, the reflector 104, and the DMD 106 in the same housing, so that the enlargement of the HUD device 101 can be suppressed.

The HUD display area Re in which the image is displayed by the HUD device 101 is a predetermined area of the windshield 114. The light distribution to the outside of the vehicle as a lamp is also performed through the windshield 114. According to the configuration of the present embodiment, it is possible to arrange the windshield 114 so as to cover a front face of the vehicle C more widely to accommodate a futuristic design. In addition, the HUD device 101 can be installed in the vehicle with higher optical and structural efficiency.

By adjusting the output level of the light source 102, it is possible to provide difference between the brightness of the image projected on the windshield 114 and the brightness of the light distribution pattern formed in front of the vehicle C. When an image is presented in a vehicle, the output level is decreased to reduce the glare felt by the occupant, whereas when a light distribution pattern is formed in the outside of the vehicle, the output level is increased to ensure good visibility.

Figure 6:
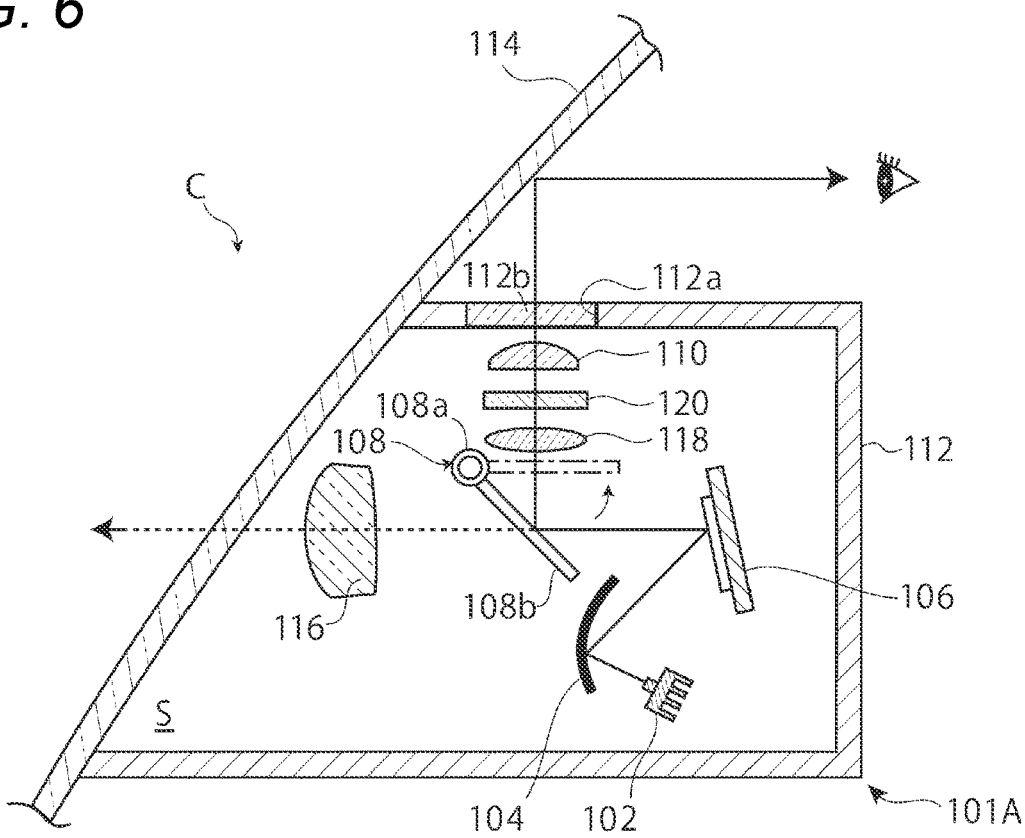
FIG. 6 is a vertical section view illustrating a configuration of an HUD device according to the fifth embodiment.

FIG. 6 is a vertical sectional view schematically illustrating a configuration of a HUD device 101A according to the fifth embodiment. Components similar to or corresponding to those in the fourth embodiment are denoted by the same reference numerals, and duplicate descriptions will be omitted as appropriate.

The HUD device 101A of the present embodiment has a configuration similar to the fourth embodiment except that a conjugate lens 118 and a color filter 120 are additionally provided between the movable mirror 108 and the first projection lens 110.

Figure 7:
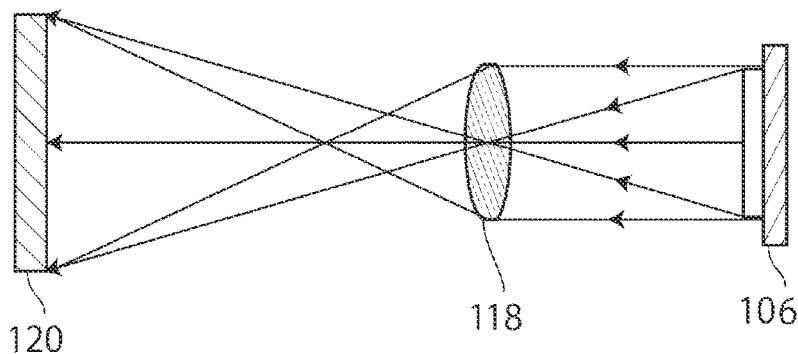
FIG. 7 illustrates relationships among a conjugate lens, a DMD, and a color filter in the HUD device of FIG. 6.

FIG. 7 is a diagram for explaining the relation among the DMD 106, the conjugate lens 118, and the color filter 120. FIG. 8 illustrates respective elements of the color filter 120 and the DMD 106 in an enlarged manner.

As described above, the DMD 106 includes a plurality of micro mirrors 107 arranged so as to form a matrix. By placing each micro mirror 107 in either a reflective condition or a non-reflective condition, it is possible to cause each micro mirror 107 to be associated with one of pixels forming an image to be displayed.

The color filter 120 has a configuration in which a plurality of elements 122 associated with three or more colors (e.g., red/green/blue or cyan/magenta/yellow) are arranged in accordance with a predetermined rule so as to form a matrix. A set of at least one element 122α, at least one element 122β, and at least one element 122γ each of which is associated with one of the three colors is defined as one unit (a color unit 123). An amount of light passing through each of the elements 122α, 122β, 122γ is controlled by a control unit 134 (not illustrated in this figure) to control a mixing ratio of the three colors for each of color units (123a, 123b, 123c . . . ), thereby causing each color unit to form white light or mixed color light.

The conjugate lens 118 is disposed between the color filter 120 and the DMD 106. The conjugate lens 118 projects a light image from the DMD 106 while increasing or decreasing in size thereof, so that one element (the micro mirror 107) of the DMD 106 is associated with one element 122 of the color filter 120. The conjugate lens 118 is an example of the first optical member.

Specifically, the light reflected by the micro mirror 107a located at the lower right corner of DMD 106 illustrated in FIG. 8 passes through the conjugate lens 118 and enters the element 122α associated with the first color and included in the color unit 123a that is located at the upper left corner of the color filter 120 illustrated in FIG. 8. The light reflected by the micro mirror 107b passes through the conjugate lens 118 and enters the element 122β associated with the second color and included in the color unit 123a. Similarly, the reflected light by the micro mirror 107c enters the element 122γ associated with the third color. The light emitted from the elements 122α, 122β, 122γ is mixed and emitted from the color unit 123a as light of a mixed color. The light emitted from each micro mirror 107 of the DMD 106 is caused to enter an associated one of the elements 122 of the color filter 120 by the conjugate lens 118. By changing the amount of reflected light of each micro mirror 107, the color formed by each element 122 is controlled. The light emitted from the color filter 120 forms a color image. Each color unit 123 corresponds to one of a plurality of pixels constituting the color image. In other words, the monochrome imaging light formed by the DMD 106 is colored by passing through the conjugate lens 118 and the color filter 120. The color filter 120 is an example of the colorizing optical member.

According to the HUD device 101A of the present embodiment, a color image can be projected onto the HUD display area Re.

Figure 9:
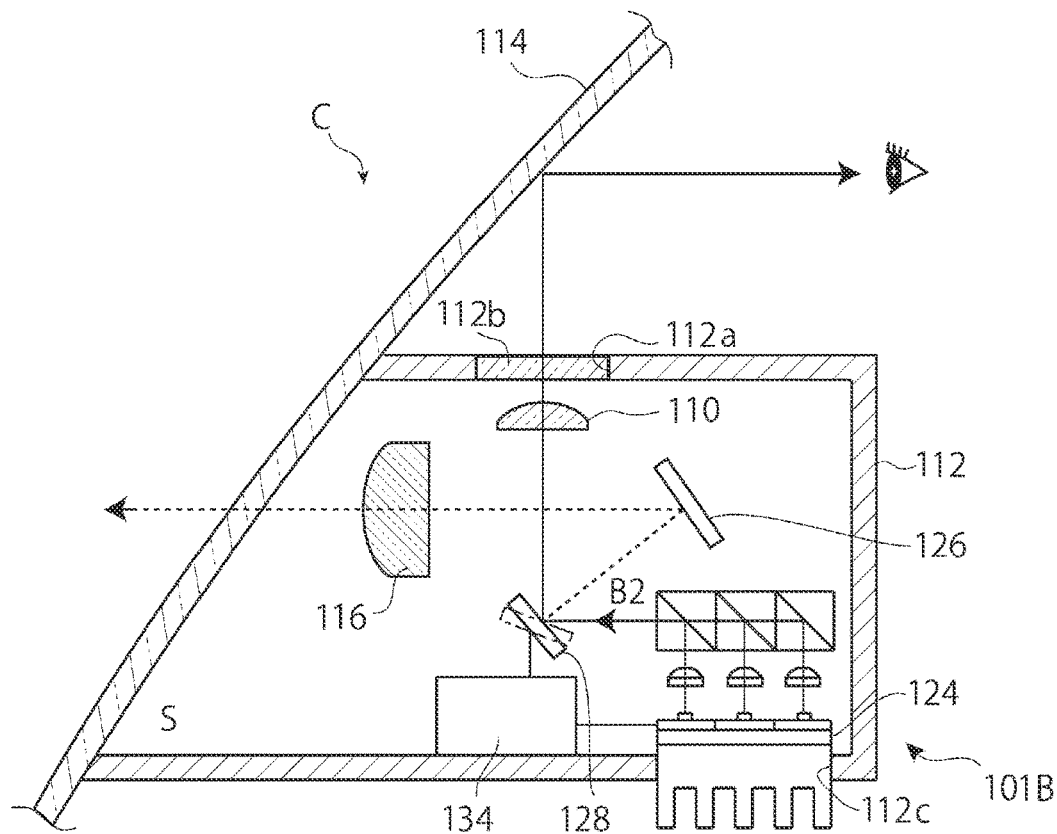
FIG. 9 is a vertical section view illustrating a configuration of an HUD device according to the sixth embodiment.

FIG. 9 is a vertical sectional view schematically illustrating a structure of a HUD device 101B according to the sixth embodiment. Components similar to or corresponding to those in the fourth embodiment are denoted by the same reference numerals, and duplicate descriptions will be omitted as appropriate.

The HUD device 101B of the present embodiment includes a light source unit 124, a scanning mechanism 128, a reflector 126, a control unit 134, a first projection lens 110, and a second projection lens 116 in a lamp chamber S.

Figure 10:
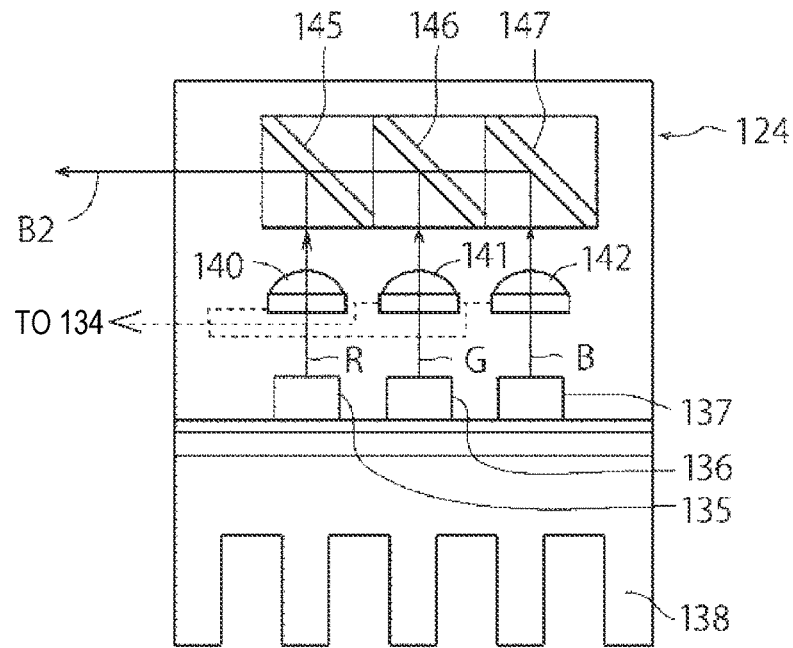
FIG. 10 is a side view illustrating a light source unit in the HUD device of FIG. 9.

FIG. 10 illustrates a side view of the light source unit 124. In FIG. 10, the interior of the light source unit 124 is illustrated as seen through a housing. The light source unit 124 is an RGB laser unit. In the light source unit 124, each of a first light source 135 for emitting red laser light, a second light source 136 for emitting green laser light, and a third light source 137 for emitting blue laser light is fixed to a support base 138 through a substrate. The light source unit 124 includes three condensing lenses 140, 141, 142 and three dichroic mirrors 145, 146, 147. The light emitted from the first light source 135 is condensed by the condensing lens 140 to be parallel light and incident on the dichroic mirror 145. The light emitted from the second light source 136 is condensed by the condensing lens 141 to be parallel light and incident on the dichroic mirror 146. The light emitted from the third light source 137 is condensed by the condensing lens 142 to be parallel light and incident on the dichroic mirror 147. RGB-mixed laser light B2 is obtained by the light having passed through the three dichroic mirrors 145, 146, 147. The laser light B2 is capable of forming each monochromatic light, mixed color light, or white light. An output level of each of the first light source 135, the second light source 136, and the third light source 137 is controlled by the control unit 134. The irradiation intensity of the laser light B2 is thus controlled. The light source of the light source unit 124 is not limited to the three light sources corresponding to the three colors of RGB, and can be replaced with a single white light source. Alternatively, an orange laser diode may be added to the three light sources so that four light sources are provided. Alternatively, a configuration for causing light emitted from a blue laser diode to pass through an yellow phosphor may be provided to generate while light by excitation. The first light source 135, the second light source 136, and the third light source 137 may be another laser light source other than the laser diode.

In the light source unit 124 of the present embodiment, the support base 138 also serves as a heat sink. The support base 138 is attached to a bore portion 112c of the housing 112 such that a portion of the support base 138 serving as the heat sink is located outside the lamp chamber S in order to avoid the temperature rise in the lamp chamber S.

Figure 11:
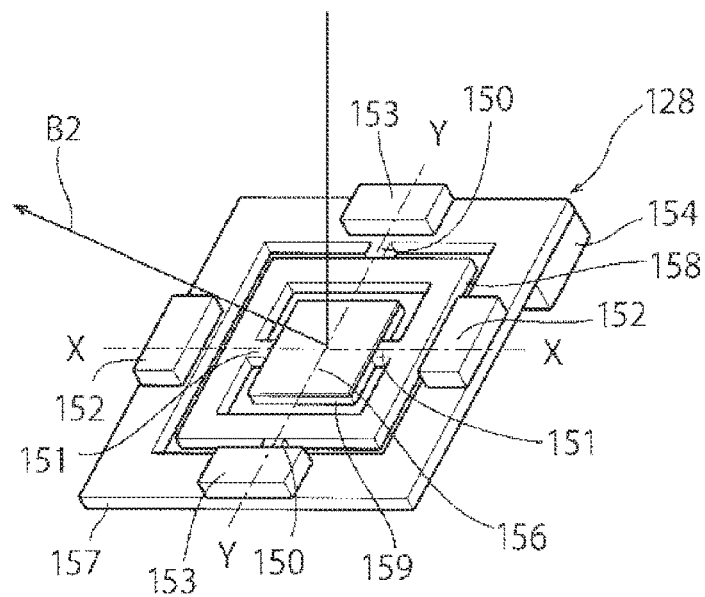
FIG. 11 is a perspective view illustrating a scanning mechanism in the HUD device of FIG. 9.

FIG. 11 illustrates a perspective view of the scanning mechanism 128. The scanning mechanism 128 is a scan device having a reflecting mirror that is tiltable in biaxial directions. In the present embodiment, an MEMS (Micro Electro Mechanical Systems) mirror is employed for instance.

The scanning mechanism 128 includes a base 157, a first pivot member 158, a second pivot member 159, a pair of first torsion bars 150, a pair of second torsion bars 151, a pair of first permanent magnets 152, a pair of second permanent magnets 153, and a terminal portion 154. The second pivot member 159 is a reflector formed in a plate shape. A reflective surface 156 is formed on a front face of the second pivot member 159 by silver deposition or sputtering treatment.

The plate-shaped first pivot member 158 is supported by the first torsion bars 150 so as to be pivotable in the left-right direction (around the Y axis). The second pivot member 159 is supported by the first pivot member 158 so as to be pivotable in the up-down direction (around the X-axis) by way of the second torsion bars 151. The first permanent magnets 152 are arranged in the extending direction of the first torsion bars 150 on the base 157. The second permanent magnets 153 are arranged in the extending direction of the second torsion bars 151 on the base 157. A first coil and a second coil to which power is supplied by way of the terminal portion 154 are provided on the first pivot member 158 and the second pivot member 159, respectively (not illustrated). The power supply to each of the first coil and the second coil is independently controlled by the control unit 134.

In accordance with the power on/off control to the first coil, the first pivot member 158 bi-directionally pivots around an axial line (the Y-axis) of the first torsion bars 150. In accordance with the power on/off control to the second coil, the second pivot member 159 bi-directionally pivots around an axial line (the X-axis) of the second torsion bars 151. The reflective surface 156 is tilted vertically and horizontally in accordance with the power on/off control to the first coil and the second coil to reflect the laser light B2.

In place of the above-described MEMS mirror, various mechanisms may be used in the scanning mechanism 128, such as a galvanomirror or a rotatable reflector that rotates in one direction about a rotation axis while reflecting light from the light source (for example, as described in Japanese Patent Publication No. 2016-195129A).

The control unit 134 controls the output level of each light source in the light source unit 124 as well as the power supply to each coil in the scanning mechanism 128. In the present embodiment, the control unit 134 is disposed in the lamp chamber S. However, the control unit 134 may be disposed outside the lamp chamber S. The reflector 126 is arranged to reflect the light scanned by the scanning mechanism 128 toward the second projection lens 116.

The light source unit 124 and the scanning mechanism 128 are arranged such that the laser light B2 emitted from the light source unit 124 can be reflected by the reflective surface 156 toward not only the reflector 126 but also the first projection lens 110. The scanning mechanism 128 scans either a surface (reflective surface) of the reflector 126 or an incident surface of the first projection lens 110 with the laser light B2 in accordance with the reciprocating pivot motion of the reflective surface 156. The scanning mechanism 128 is an example of the movable reflector.

The scanning mechanism 128 scans, with the laser light B2, an area in the surface of the reflector 126 that is associated with a drawing pattern to be drawn on a road surface. The light scanned by the scanning mechanism 128 is reflected by the reflector 126 and passes through the second projection lens 116, thereby being irradiated as a drawing pattern to an area ahead of the vehicle. The reflector 126 is an example of the second optical member.

The control unit 134 may control the light emission from each of the first light source 135, the second light source 136, and the third light source 137 in synchronization with the scanning of the laser light B2 performed by the scanning mechanism 128. For example, the scanning mechanism 128 causes the reflective surface 156 to pivot so as to cover a wider range than the area associated with the drawing pattern. The control unit 134 activates each of the first light source 135, the second light source 136, and the third light source 137 when the pivoted reflective surface 156 is placed in a position corresponding to an area where the drawing pattern is formed. Even with the above control, it is possible to form a predetermined drawing pattern in an area ahead of the vehicle C.

Figure 12:
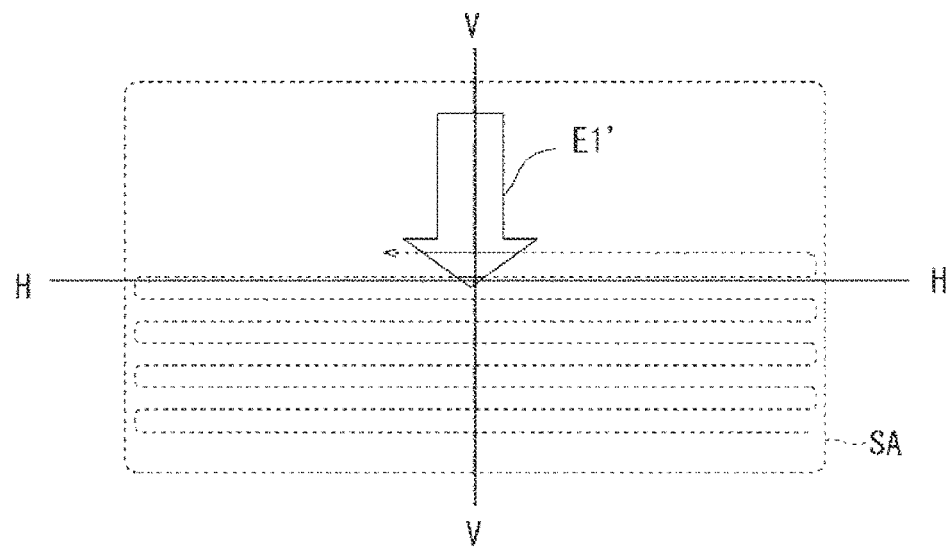
FIG. 12 illustrates how to form a drawing pattern with the HUD device of FIG. 9.

FIG. 12 illustrates a lighting area E1' corresponding to a drawing pattern E1 (see FIG. 13), which is an example of the drawing pattern formed by the HUD device 101B. The lighting area E1' is formed on the reflective surface of the reflector 126.

Figure 13:
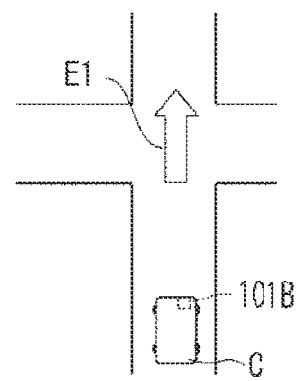
FIG. 13 illustrates how to perform road surface drawing with the HUD device of FIG. 9.

The scanning mechanism 128 of the HUD device 101B according to the present embodiment is capable of scanning a rectangular scanning area SA with the laser light B2. The control unit 134 causes the first light source 135, the second light source 136, and the third light source 137 to emit laser light when a position to be scanned is inside the lighting area E1'. The control unit 134 causes the first light source 135, the second light source 136, and the third light source 137 to stop the laser light emission when a position to be scanned is outside the lighting area E1'. The light incident on the lighting area E1' is reflected by the reflector 126, caused to pass through the second projection lens 116 and the windshield 114, and irradiated to a road surface ahead of the vehicle C. The focus of the second projection lens 116 is set on the surface (reflective surface) of the reflector 126. An image formed in the lighting area E1' by the scanning is reversed in the left-right direction by the reflector 126, then further reversed in the left-right direction and the up-down direction by the second projection lens 116, and finally projected on an area ahead of the vehicle C. Thus, as illustrated in FIG. 13, the drawing pattern E1 corresponding to the lighting area E1' is drawn on the road surface.

The scanning mechanism 128 is also capable of scanning the incident surface of the first projection lens 110 with the laser light B2 in accordance with the pivot motion of the reflective surface 156. In this case, various images formed by the scanned laser light B2 for indicating driving information can be projected, by way of the first projection lens 110, on the HUD display area Re of the windshield 114. The image projected on the windshield 114 is visually recognized by the occupant as a virtual image formed in an area ahead of the vehicle C.

According to the above configuration of the present embodiment, it is possible to cause the HUD device 101B to serve not only as the HUD device causing the occupant in the vehicle to visually recognize an image, but also as a road surface drawing device forming a drawing pattern in an area ahead of the vehicle C. Accordingly, the installation space and the number of components can be reduced in comparison with a case where the HUD device and the road surface drawing device are individually provided.

Figure 14:
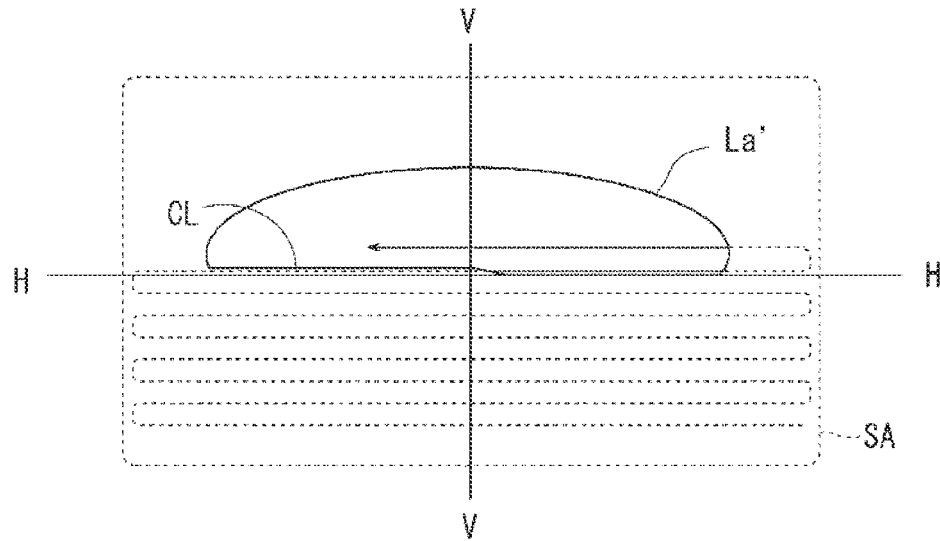
FIG. 14 illustrates a drawing pattern that can be formed with the HUD device of FIG. 9.

By forming a light distribution pattern with the scanning mechanism 128, the HUD device 101B may be used as a lighting device. FIG. 14 illustrates an example of a light distribution pattern formed by the HUD device 101B. The scanning mechanism 128 scans, with the laser light B2, a scanning area SA that is wider than a lighting area La' corresponding to a low-beam light distribution pattern La. An image formed in the lighting area La' by the scanning is reflected by the reflector 126, then caused to pass through the second projection lens 116 and the windshield 114, and finally irradiated to an area ahead of the vehicle C. Accordingly, the low-beam light distribution pattern having a cutoff line CL is formed in the area ahead of the vehicle C. Similarly, the DMD 106 may be used as the road surface imaging device.

In each of the embodiments described above, the HUD unit is caused to serve as the lighting device or the road surface drawing device, thereby allowing a common light source to be utilized for both functions. However, the light source of the HUD device can also be used as a light source for other lighting devices such as a marker lamp and indoor lamp.

Figure 15:
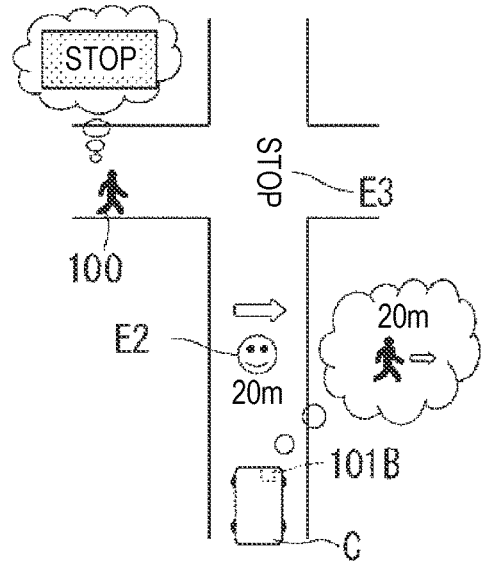
FIG. 15 illustrates road surface drawing patterns that can be formed with the HUD device of FIG. 9.

The DMD 106 or the scanning mechanism 128 may be used to provide notifications or alerts to a driver or other person such as a pedestrian on the basis of information about the vehicle itself and the surroundings of the vehicle that are acquired by various sensors. For example, the control unit 134 may determine a condition of the own vehicle based on the acquired information to draw, on an intersection illustrated in FIG. 15, a drawing pattern E2 including an arrow indicating that a pedestrian comes from the left as well as a distance to an intersection to which the pedestrian would appear in front of the vehicle, a drawing pattern E3 providing a "stop" alert for notifying a pedestrian 100 that the vehicle C goes straight toward the intersection, or the like.

The above embodiments are merely illustrative to facilitate understanding of the presently disclosed subject matter. The configuration according to each of the above embodiments can be appropriately modified, improved, or combined without departing from the gist of the presently disclosed subject matter.

The present application is based on Japanese Patent Application No. 2017-227039 filed on Nov. 27, 2017, and Japanese Patent Application No. 2017-227045 filed on Nov. 27, 2017, the entire contents of which are incorporated herein by reference.

The invention claimed is:

1. A head-up display device adapted to be installed in a vehicle, comprising:
   an image providing device configured to provide at least one of a first image adapted to be presented to the inside of the vehicle and a second image adapted to be presented to the outside of the vehicle;
   an optical member configured to be placed in at least one of a first state in which first light corresponding to the first image is directed to the inside of the vehicle and a second state in which second light corresponding to the second image is directed to the outside of the vehicle, by changing an optical property thereof in accordance with a voltage applied thereto; and
   a control device configured to adjust the voltage to place the optical member in the first state when the first image is provided, and to place the optical member in the second state when the second image is provided.

2. The head-up display device according to claim 1, wherein the control device is configured to control the image providing device such that luminous intensity of the second light is made higher than luminous intensity of the first light.

3. The head-up display device according to claim 1, wherein the first image and the second image are displayed in different positions in the vehicle.

4. The head-up display device according to claim 1, wherein the head-up display device is configured to be disposed in a lamp chamber that accommodates a lighting device configured to emit illumination light to the outside of the vehicle.

5. The head-up display device according to claim 1, wherein the head-up display device is configured such that the second light travels to the outside of the vehicle through a window of the vehicle.

* * * * *